(12) United States Patent
Tsorng et al.

(10) Patent No.: US 7,649,752 B2
(45) Date of Patent: *Jan. 19, 2010

(54) RISER CARD MODULE

(75) Inventors: Yaw-Tzorng Tsorng, Tao Yuan Shien (TW); Chen-Sheng Tang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 105 days.

This patent is subject to a terminal disclaimer.

(21) Appl. No.: 11/976,368

(22) Filed: Oct. 24, 2007

(65) Prior Publication Data

US 2008/0165488 A1    Jul. 10, 2008

(30) Foreign Application Priority Data

Jan. 9, 2007    (TW)    ............................... 96200419 U

(51) Int. Cl.
*H05K 7/14*    (2006.01)

(52) U.S. Cl. .................. 361/802; 361/679.33; 710/301; 312/140.3

(58) Field of Classification Search . 361/679.01–679.1, 361/679.33–679.42; 703/27; 710/301; 411/363; 326/30; 312/140.3
See application file for complete search history.

(56) References Cited

U.S. PATENT DOCUMENTS

| | | | |
|---|---|---|---|
| 6,958,916 B2 * | 10/2005 | Roesner et al. | 361/790 |
| 2003/0095381 A1 * | 5/2003 | Lee et al. | 361/687 |
| 2008/0165487 A1 * | 7/2008 | Tsorng et al. | 361/683 |

* cited by examiner

*Primary Examiner*—Hung V Duong
(74) *Attorney, Agent, or Firm*—Rabin & Berdo, PC

(57) ABSTRACT

A riser card module includes a riser card and a mounting rack. The riser card is inserted in a slot of a main board vertically and has a first hook member arranged on the side of the slot. The mounting rack includes an upright board and an engagement member. The upright board mounts the riser card in parallel. The engagement member has a mounted portion, a force portion, and a hook portion. The mounted portion is mounted on the upright board. The force portion and the mounted portion form a predetermined angle. The hook member is connected on the force portion and has a second hook member hooking on the first hook member. When the force portion is pressed toward a direction reducing the predetermined angle, the second hook member is disengaged from the first hook member.

10 Claims, 6 Drawing Sheets

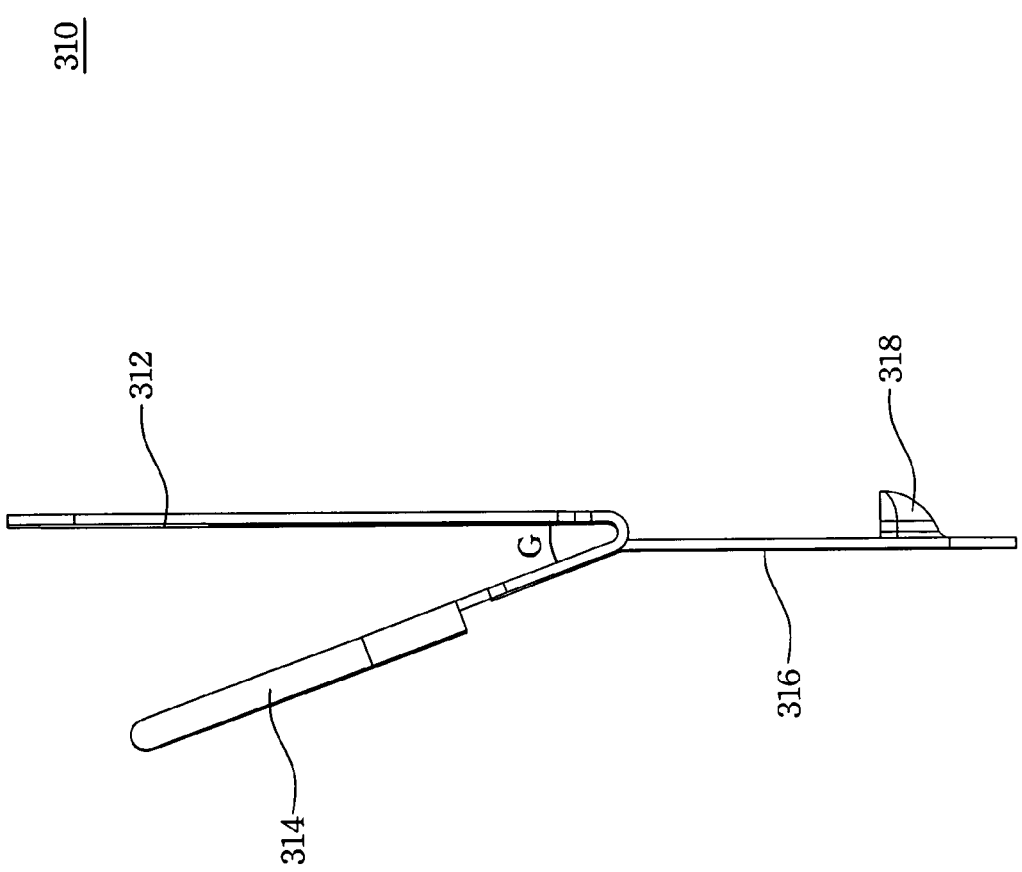

RISER CARD MODULE

RELATED APPLICATION

This application claims priority to Taiwan Application Serial Number 96200419, filed Jan. 9, 2007, which is herein incorporated by reference.

BACKGROUND

1. Field of Invention

The present invention relates to an inserted card structure. More particularly, the present invention relates to a riser card module for a computer system.

2. Description of Related Art

In order to increase the capacity of the server rack to increase computing speed, every server module must reduce the volume. Therefore, the server module is compact and small.

However, the common expansion card could not install in the slot of the main board vertically due to the small side of the server module. Hence, the riser card is vertically installed in the slot of the main board first, then the common expansion card is installed in the expansion slot of the riser card. Therefore, the common expansion card is parallel with the main board.

Moreover, the riser card usually is mounted on the mounting rack. But the riser card module composed of the riser card and the mounting rack is not easy to dismount due to the small space of the server module. Hence, the room for upgrade of the server module is reduced. In addition, there is no mounting structure between the riser card module and the main board, the riser card module structure is unbalance when the expansion card is installed in the expansion slot of the riser card.

Therefore, it is desirable to reduce the difficulty to dismount the riser card module from the main board and increase the stability of the riser card module structure.

SUMMARY

The current embodiment discloses a riser card module including a riser card and a mounting rack. The riser card is inserted in a slot of a main board vertically. The slot has a first hook member arranged on the side of the slot. The mounting rack is connected to the riser card and includes an upright board and an engagement member. The upright board mounts the riser card in parallel. The engagement member has a mounted portion, a force portion and a hook portion. The mounted portion is mounted on the upright board. The force portion and the mounted portion form a predetermined angle. The hook member is connected on the force portion and the hook member has a second hook member hooked onto the first hook member. When the force portion is pressed toward a direction reducing the predetermined angle, the second hook member is disengaged from the first hook member.

Moreover, the mounted portion and the force portion is formed a V-shape structure. The hook member is connected to the V-shape structure, and has a second hook member hooking on the first hook member. When the force portion is pressed toward a direction reducing the included angle of the V-shape structure, the second hook member disengaged from the first hook member.

In addition, the mounting rack further comprises a top board vertically connected to the side of the upright board opposite to the main board. The mounting rack further comprises a handle pivoted on the mounting rack so that the handle is parallel with the top board or is rotated with respect to the top board with a regular angel. The handle further comprises a protrusion protruded with respect to the force portion. When the handle is rotated respect to the top board, the protrusion presses the force portion so that the second hook member is disengaged from the first hook member.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 3B depicts the engagement member of the second embodiment; and

DESCRIPTION OF THE PREFERRED EMBODIMENTS

Figure 1:
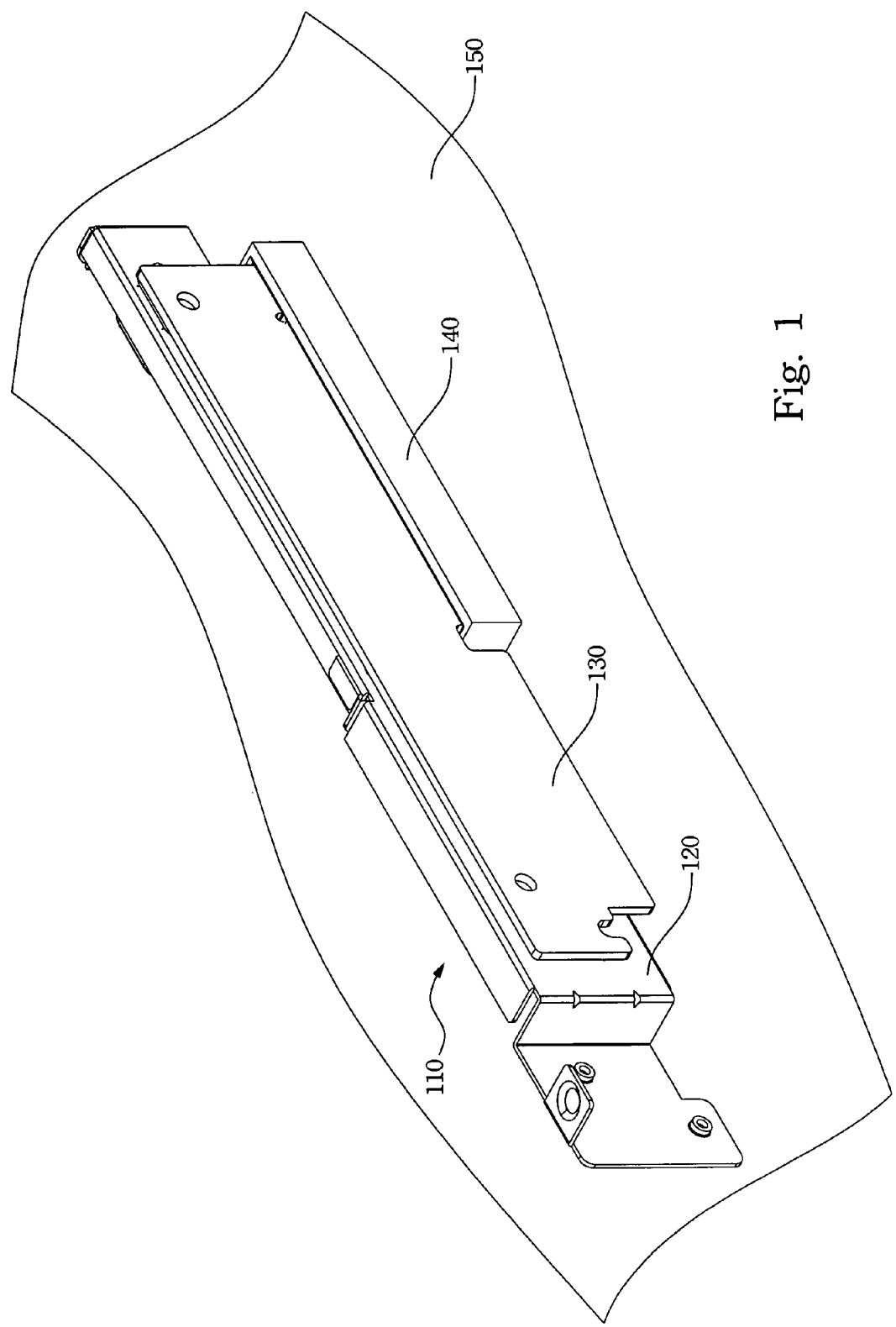
FIG. 1 depicts the riser card module of the first embodiment installed on the main board.

Reference will now be made in detail to the present preferred embodiments of the invention, examples of which are illustrated in the accompanying drawings. Wherever possible, the same reference numbers are used in the drawings and the description to refer to the same or like parts.

The embodiments of the present invention describe a riser card module included an engagement member arranged thereon. The engagement member hooks to the hooking member arranged on the slot to increase the stability of the riser card module structure. Moreover, the riser card module includes a handle to control the movement of the engagement member. When the handle member is rotated, the engagement member disengages from the hooking device arranged on the slot then the riser card module is dismounted from the server module easily. The following describes some embodiments of the invention. The same elements in the different figures and not described in the text are not labeled.

First Embodiment

Please refer to FIG. 1. FIG. 1 depicts the riser module of the first embodiment installed on the main board 150. The riser card module includes a riser card 130 and a mounting rack 110. The riser card is inserted in a slot 140 of the main board 150. The mounting rack 110 includes an upright board 120. The mounting rack 110 is connected to the riser card 130 through the upright board 120. That is, the upright board 120 mounts the riser card 130 in parallel.

Figure 2A:
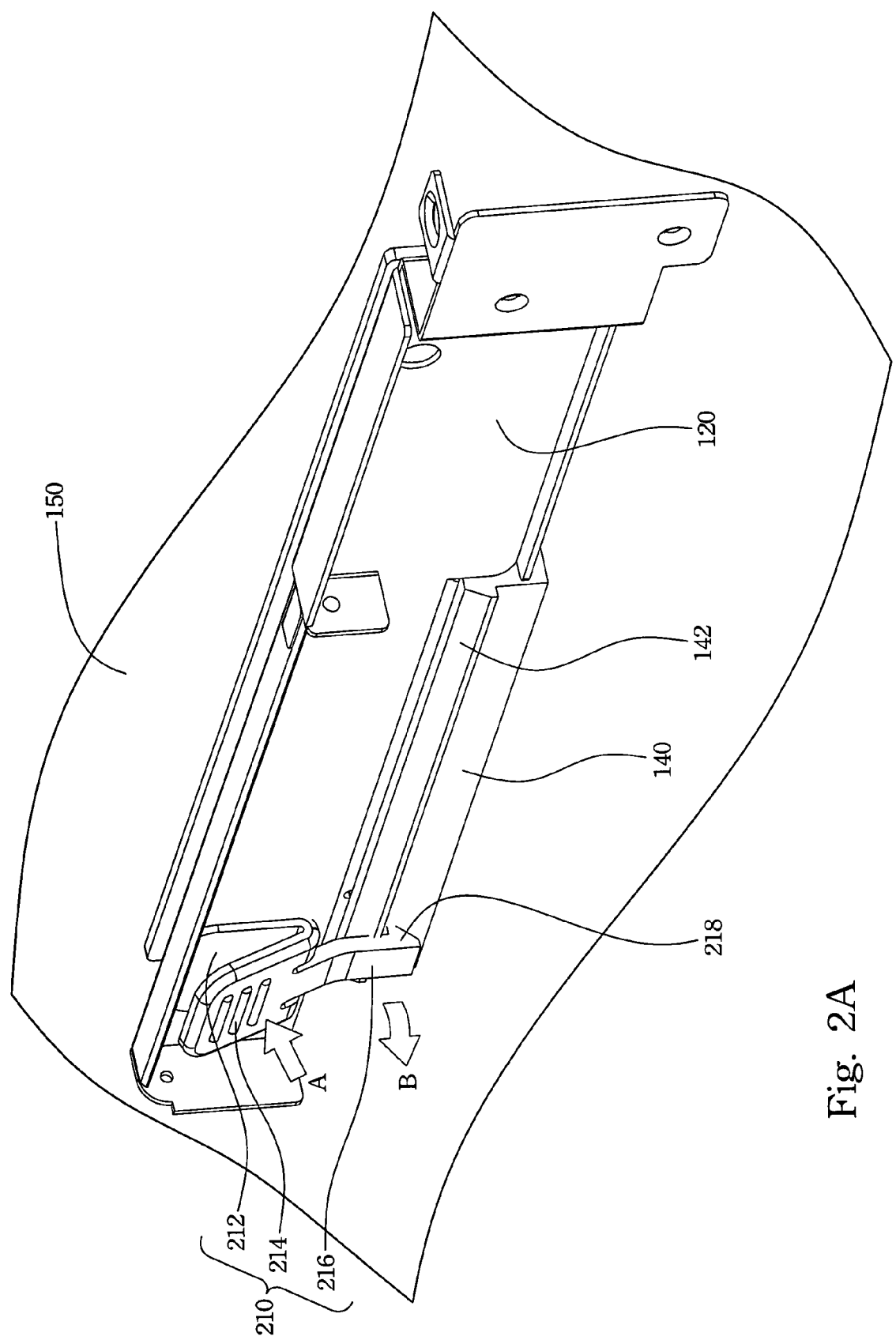
FIG. 2A depicts the riser card module of the first embodiment installed on the main board at another view angle.
Figure 2B:
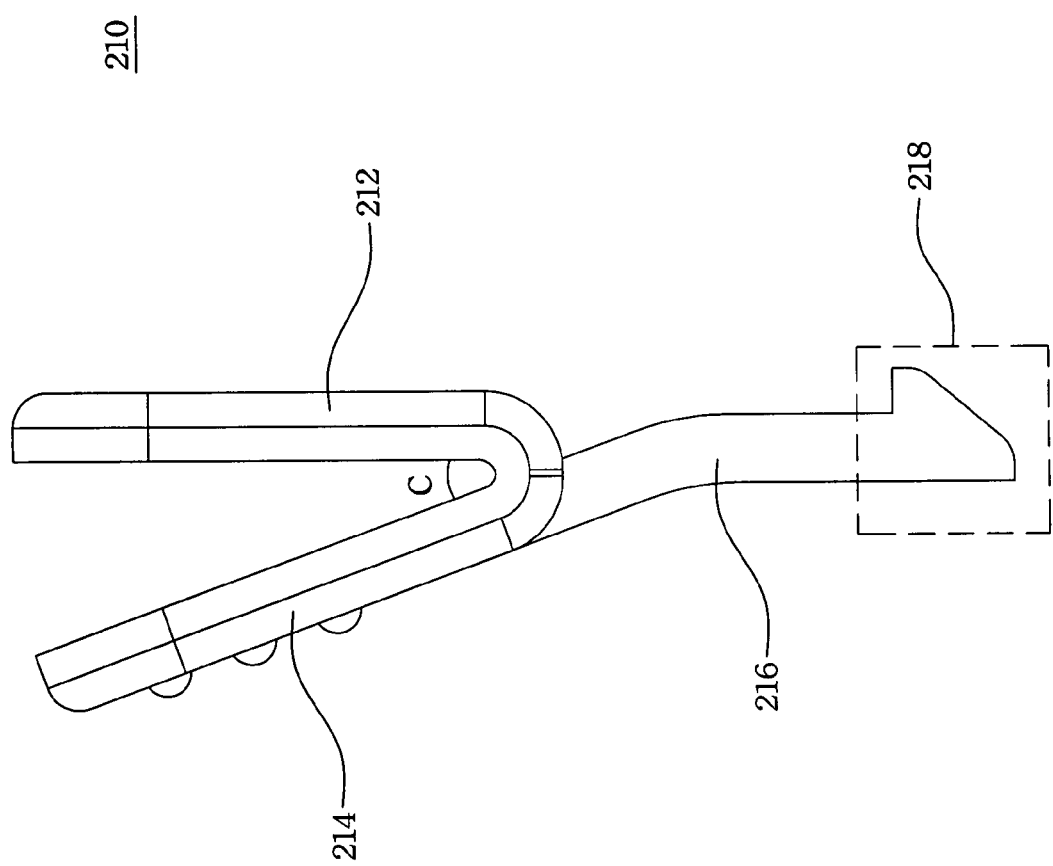
FIG. 2B depicts the engagement member of the first embodiment.

Now, please refer to FIG. 2A and FIG. 2B. FIG. 2A depicts the riser card module of the first embodiment installed on the main board 150 at another view angle. FIG. 2B depicts the engagement member 210 of the first embodiment.

The slot 140 has a first hook member 142 arranged on the side of the slot 140. In this embodiment, the upright board 120 further includes an engagement member 210 arranged thereon. The engagement member has a mounted portion 212, a force portion 214 and a hook portion 216. The mounted portion 212 is mounted on the upright board 120 so that the engagement member is mounted on the upright board 120. The force portion 214 and the mounted portion 212 form a predetermined angle C. The hook portion 216 is connected on the force portion 214, and has a second hook member 218 arranged with respect to the first hook member 214 so that the second hook member 218 hooks on the first hook member 142. When the force portion 214 is pressed toward a direction of arrow A (that is, the direction reducing the predetermined angle C), the hook portion 216 is moved toward a direction of arrow B so that the second hook member 218 is disengage from the first hook member 142.

In other words, the mounted portion 212 and the force portion 214 form a V-shape structure, and the hook member 216 is connected to V-shape structure. When the force portion 210 is pressed toward a direction reducing the included angle C of the V-shape structure, the second hook member 218 is disengaged from the first hook member 142.

Due to the first hook member 142 is hooked with the second hook 218, the stability of the riser card module structure is increased. Moreover, the force portion 214 of the engagement member 210 can control the movement of the hook portion 216. When the second hook member 218 disengages from the first hook member 142, the riser card module is dismounted from the server module easily.

Second Embodiment

Figure 3A:
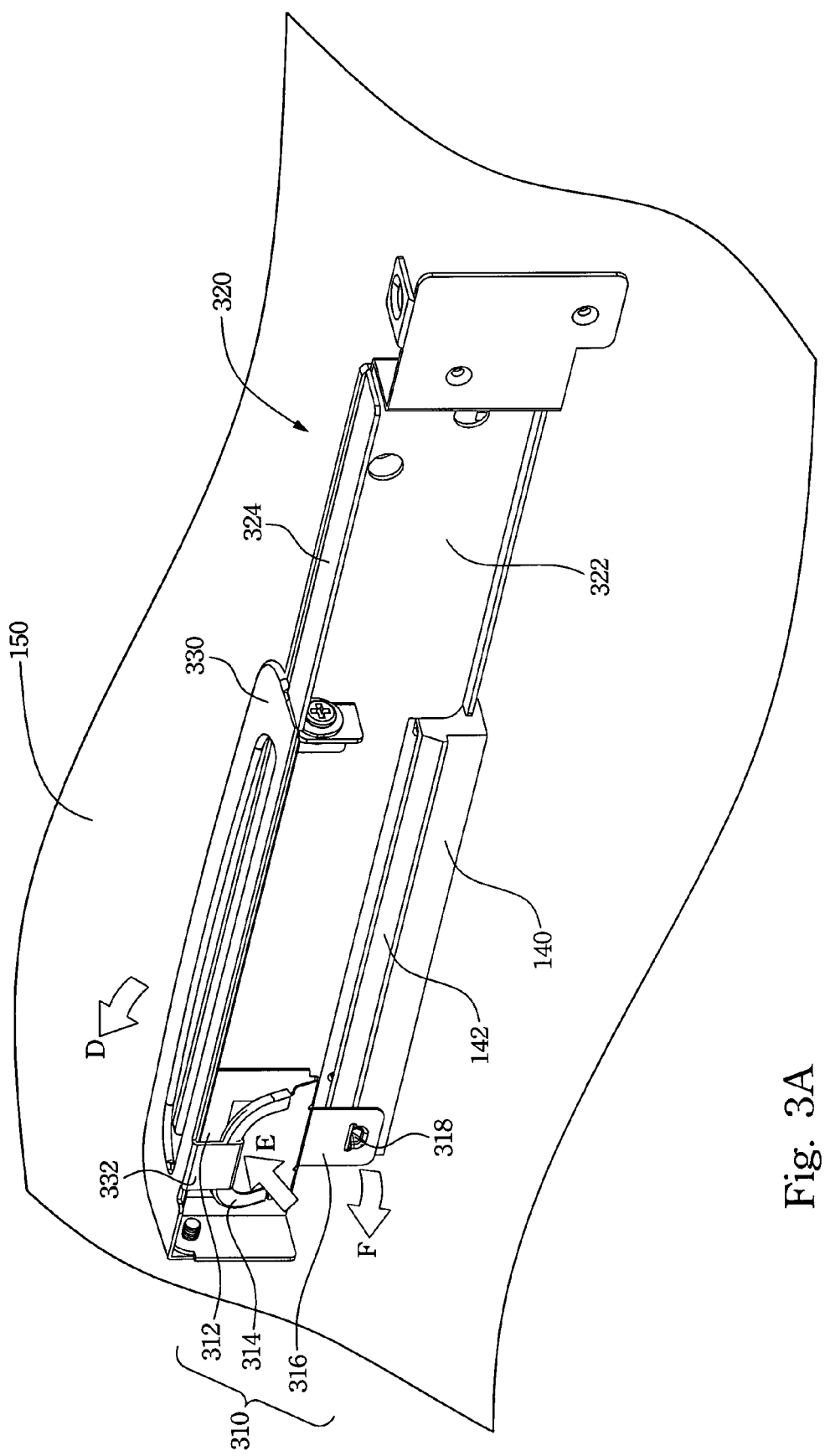
FIG. 3A depicts the riser card module of the second embodiment installed on the main board.

In order to dismount the riser card module more convenient, a handle is added in this embodiment. Please refer to FIG. 3A and FIG. 3B together. FIG. 3A depicts the riser card module of the second embodiment installed on the main board 150. FIG. 3B depicts the engagement member 310 of the second embodiment. The structure of the engagement member 310 is the same as the first embodiment, the only difference is on the appearance. The engagement member 310 having a mounted portion 312, a force portion 314 and a hook portion 316. The mounted portion 312 and the force portion 314 form a predetermined angle G. The second hook member 318 of the hook portion 316 is arranged with respect to the first hook member 142 so that the second hook member 318 hooks onto the first hook member 142.

The mounting race 320 includes an upright board 322 and a top board 324. The structure of the upright board 322 is same to the first embodiment. The top board 324 vertically connected to the side of the upright board 322 opposite to the main board 150. In this embodiment, the mounting rack 320 further includes a handle 330 pivoted on the mounting rack 320. Therefore, the handle 330 can be parallel with the top board 324 or be rotated with respect to the top board 324 with a regular angle.

In addition, the handle 330 includes a protrusion 332 protruded form the handle 330 and with respect to the force portion 314. When the handle 330 is rotated toward a direction of arrow D (that is, rotated with respect to the top board 324), the protrusion 332 presses the force portion 314. Hence, the force portion is moved toward the direction of arrow E, that is, the direction reducing the predetermined angle G so that the hook portion 316 is moved toward the direction of arrow F. Moreover, the protrusion 332 is protruded from the handle 330 vertically.

Figure 3C:
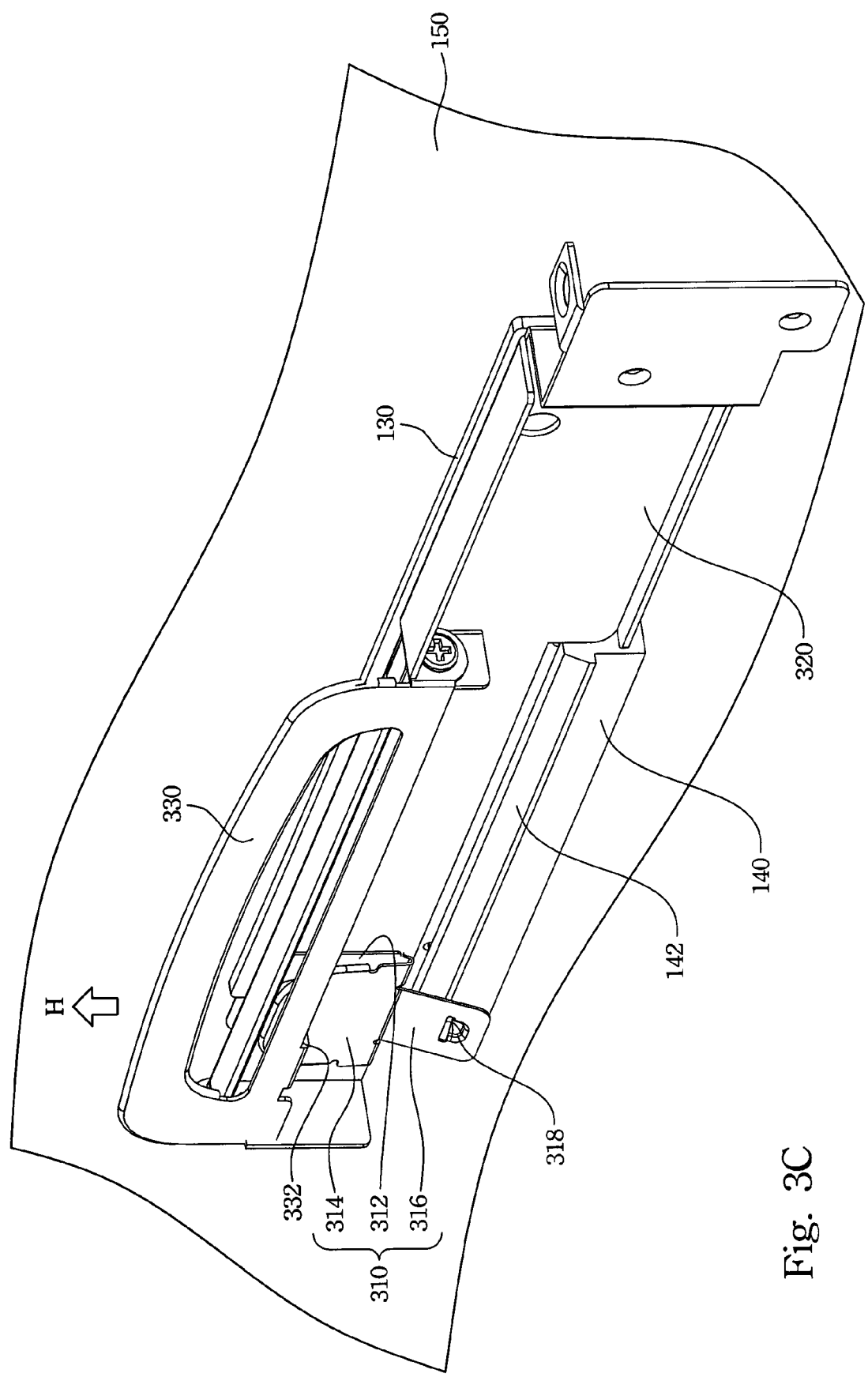
FIG. 3C depicts an operation diagram of the second embodiment.

In order to emphasize advantages and practicability of the riser card module, please refer to FIG. 3C. This figure is an operation diagram of the second embodiment. Due to the protrusion 332 arranged on the handle 330 vertically, when the handle 330 is perpendicular to the main board 150, the protrusion 332 is against to the force portion 314 and the force portion 314 has the maximum movement range. Hence, the riser card 130 is dismounted from the slot 140 when the handle 330 receives a force toward a direction of arrow H. The riser card module is dismounted from the server module easily.

Accordingly, the riser card module uses the engagement member and the hooking member arranged on the slot to increase the stability of the raiser card module. Moreover, a handle is used to control the movement of the engagement member. When the handle member is rotated, the engagement member disengages from the hooking device arranged on the slot then the riser card module is dismounted from the server module easily.

Although the present invention has been described in considerable detail with reference t certain preferred embodiments thereof, other embodiments are possible. Therefore, their spirit and scope of the appended claims should no be limited to the description of the preferred embodiments container herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A riser card module, comprising:
a riser card inserted in a slot of a main board vertically, the slot having a first hook member arranged on the side of the slot; and
a mounting rack connected to the riser card, the mounting rack comprising:
an upright board mounting the riser card in parallel; and
an engagement member having a mounted portion, a force portion and a hook portion, the mounted portion mounted on the upright board, the force portion and the mounted portion forming a predetermined angle, the hook member connected on the force portion and the hook member having a second hook member hooking on the first hook member, when the force portion pressed toward a direction reducing the predetermined angle, the second hook member disengaged from the first hook member.

2. The riser card module of claim 1, wherein the mounting rack further comprises a top board vertically connected to the side of the upright board opposite to the main board.

3. The riser card module of claim 2, wherein the mounting rack further comprises a handle pivoted on the mounting rack so that the handle parallel with the top board or rotated with respect to the top board with an regular angle.

4. The riser card module of claim 3, wherein the handle further comprises a protrusion protruded with respect to the force portion, when the handle rotated with respect to the top board, the protrusion pressing the force portion towards the direction reducing the predetermined angle.

5. The riser card module of claim 4, wherein the protrusion protruded from the handle vertically.

6. A riser card module, comprising:
a riser card inserted in a slot of a main board vertically, the slot having a first hook member arranged on the side of the slot; and
a mounting rack connected to the riser card, the mounting rack comprising:

an upright board mounting the riser card in parallel; and an engagement member having a mounted portion, a force portion and a hook portion, the mounted portion and the force portion formed a V-shape structure, and the mounted portion mounted on the upright board, the hook member connected on the V-shape structure and the hook member having a second hook member hooking on the first hook member, when the force portion pressed toward a direction reducing the included angle of the V-shape structure, the second hook member disengaged from the first hook member.

7. The riser card module of claim 6, wherein the mounting rack further comprises a top board vertically connected to the side of the upright board opposite to the main board.

8. The riser card module of claim 7, wherein the mounting rack further comprises a handle pivoted on the mounting rack so that the handle parallel with the top board or rotated with respect to the top board with an regular angle.

9. The riser card module of claim 8, wherein the handle further comprises a protrusion protruded with respect to the force portion, when the handle rotated with respect to the top board, the protrusion pressing the force portion towards the direction reducing the included angle of the V-shape structure.

10. The riser card module of claim 9, wherein the protrusion protruded from the handle vertically.

* * * * *